United States Patent
Bill et al.

(10) Patent No.: US 8,572,278 B2
(45) Date of Patent: *Oct. 29, 2013

(54) GENERATING MULTIPLE DATA STREAMS FROM A SINGLE DATA SOURCE

(75) Inventors: David S. Bill, San Francisco, CA (US); Scott K. Brown, Marietta, GA (US); William J. Raduchel, Palo Alto, CA (US); Gilbert G. Weigand, Ashburn, VA (US); Christopher L. Amen-Kroeger, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 1340 days.

This patent is subject to a terminal disclaimer.

(21) Appl. No.: 11/848,430

(22) Filed: Aug. 31, 2007

(65) Prior Publication Data

US 2008/0049723 A1 Feb. 28, 2008
US 2012/0201237 A9 Aug. 9, 2012

Related U.S. Application Data

(63) Continuation of application No. 09/893,962, filed on Jun. 29, 2001, now Pat. No. 7,266,609.

(60) Provisional application No. 60/286,964, filed on Apr. 30, 2001.

(51) Int. Cl.
G06F 15/16 (2006.01)
H04Q 11/00 (2006.01)

(52) U.S. Cl.
USPC ............................. 709/236; 370/390; 370/392

(58) Field of Classification Search
None
See application file for complete search history.

(56) References Cited

U.S. PATENT DOCUMENTS

| | | | |
|---|---|---|---|
| 4,872,160 A | 10/1989 | Hemmady et al. |
| 5,014,125 A | 5/1991 | Pocock et al. |
| 5,283,639 A | 2/1994 | Esch et al. |
| 5,493,568 A | 2/1996 | Sampat et al. |
| 5,543,856 A | 8/1996 | Rosser et al. |
| 5,583,561 A | 12/1996 | Baker et al. |
| 5,600,364 A | 2/1997 | Hendricks et al. |
| 5,600,646 A | 2/1997 | Polomski |
| 5,604,542 A | 2/1997 | Dedrick |
| 5,608,446 A | 3/1997 | Carr et al. |
| 5,646,675 A | 7/1997 | Copriviza et al. |
| 5,682,597 A | 10/1997 | Ganek et al. |

(Continued)

FOREIGN PATENT DOCUMENTS

| | | |
|---|---|---|
| CA | 2445869 | 11/2002 |
| CN | 1511289 | 7/2004 |

(Continued)

OTHER PUBLICATIONS

Furht, B. et al., "IP Simulcast: A New Technique for Multimedia Broadcasting Over the Internet;" Cit. Journal of Computing and Information Technology, Zagreb, HR, vol. 6, No. 3, Sep. 1, 1998, pp. 245-254, XP000870379, ISSN: 1330-1136, *the whole document*.

(Continued)

Primary Examiner — Patrice Winder
(74) Attorney, Agent, or Firm — Keller Jolley Preece

(57) ABSTRACT

A switch having a first communications interface to receive a stream of data units, a buffer to store the payload portion of the data unit, a replicator to duplicate at least the payload portion of the data unit, and a second communications interface to enable access to the stream of data units by two or more terminals.

36 Claims, 4 Drawing Sheets

(56) References Cited

U.S. PATENT DOCUMENTS

| | | |
|---|---|---|
| 5,689,641 A | 11/1997 | Ludwig et al. |
| 5,742,597 A | 4/1998 | Holt et al. |
| 5,774,660 A | 6/1998 | Brendel et al. |
| 5,778,187 A | 7/1998 | Monteiro et al. |
| 5,799,002 A | 8/1998 | Krishman |
| 5,802,301 A | 9/1998 | Dan et al. |
| 5,809,237 A | 9/1998 | Watts et al. |
| 5,815,662 A | 9/1998 | Ong |
| 5,819,036 A | 10/1998 | Adams et al. |
| 5,838,912 A | 11/1998 | Poon et al. |
| 5,841,763 A | 11/1998 | Leondires et al. |
| 5,867,502 A | 2/1999 | Chang |
| 5,872,588 A | 2/1999 | Aras et al. |
| 5,889,950 A | 3/1999 | Kuzma |
| 5,913,062 A | 6/1999 | Vrvilo et al. |
| 5,917,830 A | 6/1999 | Chen et al. |
| 5,920,700 A | 7/1999 | Gordon et al. |
| 5,935,245 A | 8/1999 | Sherer |
| 5,946,614 A | 8/1999 | Robins et al. |
| 5,961,603 A | 10/1999 | Kunkel et al. |
| 5,973,722 A | 10/1999 | Wakai et al. |
| 5,983,005 A | 11/1999 | Monteiro et al. |
| 5,995,943 A | 11/1999 | Bull et al. |
| 6,006,265 A | 12/1999 | Rangan et al. |
| 6,011,782 A | 1/2000 | DeSimone et al. |
| 6,034,746 A | 3/2000 | Desai et al. |
| 6,052,805 A | 4/2000 | Chen et al. |
| 6,061,349 A | 5/2000 | Coile et al. |
| 6,061,504 A | 5/2000 | Tzelnic et al. |
| 6,064,376 A | 5/2000 | Berezowski et al. |
| 6,097,720 A | 8/2000 | Araujo et al. |
| 6,101,187 A | 8/2000 | Cukier et al. |
| 6,115,752 A | 9/2000 | Chauhan |
| 6,119,163 A | 9/2000 | Monteiro et al. |
| 6,141,336 A | 10/2000 | Bauchot et al. |
| 6,151,621 A | 11/2000 | Colyer et al. |
| 6,151,632 A | 11/2000 | Chaddha et al. |
| 6,157,635 A | 12/2000 | Wang et al. |
| 6,173,314 B1 | 1/2001 | Kurashima et al. |
| 6,189,039 B1 | 2/2001 | Harvey et al. |
| 6,195,680 B1 | 2/2001 | Goldszmidt et al. |
| 6,201,859 B1 | 3/2001 | Memhard et al. |
| 6,208,975 B1 | 3/2001 | Bull et al. |
| 6,216,129 B1 | 4/2001 | Eldering |
| 6,226,686 B1 | 5/2001 | Rothschild et al. |
| 6,253,238 B1 | 6/2001 | Lauder et al. |
| 6,259,701 B1 | 7/2001 | Shur et al. |
| 6,266,335 B1 | 7/2001 | Bhaskaran |
| 6,298,088 B1 | 10/2001 | Bhatt et al. |
| 6,298,089 B1 | 10/2001 | Gazit |
| 6,298,129 B1 | 10/2001 | Culver et al. |
| 6,308,327 B1 | 10/2001 | Liu et al. |
| 6,314,451 B1 | 11/2001 | Landsman et al. |
| 6,314,464 B1 | 11/2001 | Murata et al. |
| 6,327,622 B1 | 12/2001 | Jindal et al. |
| 6,339,761 B1 | 1/2002 | Cottingham |
| 6,347,090 B1 | 2/2002 | Ooms et al. |
| 6,357,042 B2 | 3/2002 | Srinivasan et al. |
| 6,360,195 B1 | 3/2002 | Liao et al. |
| 6,363,075 B1 | 3/2002 | Huang et al. |
| 6,363,429 B1 | 3/2002 | Ketcham |
| 6,370,112 B1 | 4/2002 | Voelker |
| 6,377,996 B1 | 4/2002 | Lumelsky et al. |
| 6,381,746 B1 | 4/2002 | Urry |
| 6,389,462 B1 | 5/2002 | Cohen et al. |
| 6,404,745 B1 | 6/2002 | O'Neil et al. |
| 6,411,773 B1 | 6/2002 | De Vos et al. |
| 6,415,312 B1 | 7/2002 | Boivie |
| 6,415,323 B1 | 7/2002 | McCanne et al. |
| 6,418,214 B1 | 7/2002 | Smythe et al. |
| 6,434,622 B1 | 8/2002 | Monteiro et al. |
| 6,437,830 B1 | 8/2002 | Horlander |
| 6,457,043 B1 | 9/2002 | Kwak et al. |
| 6,466,550 B1 | 10/2002 | Foster et al. |
| 6,490,285 B2 | 12/2002 | Lee et al. |
| 6,490,320 B1 | 12/2002 | Vetro et al. |
| 6,493,872 B1 | 12/2002 | Rangan et al. |
| 6,505,169 B1 | 1/2003 | Bhagavath et al. |
| 6,510,553 B1 | 1/2003 | Hazra |
| 6,516,350 B1 | 2/2003 | Lumelsky et al. |
| 6,526,426 B1 | 2/2003 | Lakritz |
| 6,564,003 B2 | 5/2003 | Marko et al. |
| 6,564,380 B1 | 5/2003 | Murphy |
| 6,587,138 B1 | 7/2003 | Vogt et al. |
| 6,615,039 B1 | 9/2003 | Eldering |
| 6,622,174 B1 | 9/2003 | Ukita et al. |
| 6,625,773 B1 | 9/2003 | Boivie et al. |
| 6,646,997 B1 | 11/2003 | Baxley et al. |
| 6,665,726 B1 | 12/2003 | Leighton et al. |
| 6,684,249 B1 | 1/2004 | Frerichs et al. |
| 6,698,020 B1 | 2/2004 | Zigmond et al. |
| 6,701,355 B1 | 3/2004 | Brandt et al. |
| 6,704,930 B1 | 3/2004 | Eldering et al. |
| 6,708,213 B1 | 3/2004 | Bommaiah et al. |
| 6,711,212 B1 | 3/2004 | Lin |
| 6,718,551 B1 | 4/2004 | Swix et al. |
| 6,728,356 B1 | 4/2004 | Carroll |
| 6,728,784 B1 | 4/2004 | Mattaway |
| 6,738,978 B1 | 5/2004 | Hendricks et al. |
| 6,751,219 B1 | 6/2004 | Lipp et al. |
| 6,785,704 B1 | 8/2004 | McCanne |
| 6,826,185 B1 | 11/2004 | Montanaro et al. |
| 6,847,618 B2 | 1/2005 | Laursen et al. |
| 6,850,707 B1 | 2/2005 | Chang et al. |
| 6,856,967 B1 | 2/2005 | Woolston et al. |
| 6,873,627 B1 | 3/2005 | Miller et al. |
| 6,879,565 B2 | 4/2005 | Baxley et al. |
| 6,889,385 B1 | 5/2005 | Rakib et al. |
| 6,891,828 B2 | 5/2005 | Ngai |
| 6,910,078 B1 | 6/2005 | Raman et al. |
| 6,978,470 B2 | 12/2005 | Swix et al. |
| 6,993,081 B1 | 1/2006 | Brunheroto et al. |
| 6,996,102 B2 | 2/2006 | Pegrum et al. |
| 7,016,351 B1 | 3/2006 | Farinacci et al. |
| 7,039,932 B2 | 5/2006 | Eldering |
| 7,054,949 B2 | 5/2006 | Jennings |
| 7,062,510 B1 | 6/2006 | Eldering |
| 7,072,972 B2 | 7/2006 | Chin et al. |
| 7,089,577 B1 | 8/2006 | Rakib et al. |
| 7,100,183 B2 | 8/2006 | Kunkel et al. |
| 7,124,166 B2 | 10/2006 | Brown |
| 7,133,922 B1 | 11/2006 | She et al. |
| 7,142,509 B1 | 11/2006 | Rovner et al. |
| 7,187,690 B2 | 3/2007 | Taylor |
| 7,203,758 B2 | 4/2007 | Cook et al. |
| 7,237,033 B2 | 6/2007 | Weigand et al. |
| 7,266,609 B2 | 9/2007 | Bill et al. |
| 7,292,571 B2 | 11/2007 | Brown |
| 7,299,291 B1 | 11/2007 | Shaw |
| 7,394,850 B1 | 7/2008 | Gordon |
| 7,430,609 B2 | 9/2008 | Brown et al. |
| 7,447,738 B1 | 11/2008 | Andrews et al. |
| 7,500,258 B1 | 3/2009 | Eldering |
| 7,548,962 B2 | 6/2009 | Weber et al. |
| 7,694,013 B2 | 4/2010 | Weigand |
| 7,711,791 B2 | 5/2010 | DuVall et al. |
| 7,895,076 B2 | 2/2011 | Kutaragi et al. |
| 7,921,157 B2 | 4/2011 | Brown |
| 7,991,911 B2 | 8/2011 | Weigand |
| 8,028,092 B2 | 9/2011 | Brown et al. |
| 8,130,755 B2 | 3/2012 | Brown |
| 8,135,620 B2 | 3/2012 | Barsade et al. |
| 8,224,991 B2 | 7/2012 | Weigand |
| 8,463,853 B2 | 6/2013 | Brown |
| 2001/0044851 A1 | 11/2001 | Rothman et al. |
| 2001/0048662 A1 | 12/2001 | Suzuki et al. |
| 2001/0049620 A1 | 12/2001 | Blasko |
| 2002/0019984 A1 | 2/2002 | Rakib |
| 2002/0024956 A1 | 2/2002 | Keller-Tuberg |
| 2002/0026482 A1 | 2/2002 | Morishige et al. |
| 2002/0031126 A1 | 3/2002 | Crichton et al. |
| 2002/0040404 A1 | 4/2002 | Lahr |
| 2002/0065922 A1 | 5/2002 | Shastri |
| 2002/0082914 A1 | 6/2002 | Beyda et al. |

(56) References Cited

U.S. PATENT DOCUMENTS

| | | |
|---|---|---|
| 2002/0093963 A1 | 7/2002 | Roullet et al. |
| 2002/0103863 A1 | 8/2002 | Pearson |
| 2002/0103864 A1 | 8/2002 | Rodman et al. |
| 2002/0112004 A1 | 8/2002 | Reid et al. |
| 2002/0112069 A1 | 8/2002 | Sim |
| 2002/0114302 A1 | 8/2002 | McDonald et al. |
| 2002/0116532 A1 | 8/2002 | Berg |
| 2002/0126685 A1 | 9/2002 | Leatherbury et al. |
| 2002/0131400 A1 | 9/2002 | Tinsley et al. |
| 2002/0161847 A1 | 10/2002 | Weigand et al. |
| 2002/0161910 A1 | 10/2002 | Bill et al. |
| 2002/0172508 A1 | 11/2002 | Zennou |
| 2002/0191543 A1 | 12/2002 | Buskirk et al. |
| 2002/0191950 A1 | 12/2002 | Wang |
| 2003/0005052 A1 | 1/2003 | Feuer et al. |
| 2003/0018966 A1 | 1/2003 | Cook et al. |
| 2003/0018968 A1 | 1/2003 | Avnet |
| 2003/0061278 A1 | 3/2003 | Agarwalla et al. |
| 2003/0067934 A1 | 4/2003 | Hooper et al. |
| 2003/0099202 A1 | 5/2003 | Lear et al. |
| 2003/0126197 A1 | 7/2003 | Black et al. |
| 2003/0145038 A1 | 7/2003 | Bin Tariq et al. |
| 2003/0188308 A1 | 10/2003 | Kizuka |
| 2004/0025186 A1 | 2/2004 | Jennings et al. |
| 2004/0205829 A1 | 10/2004 | Hane, III. |
| 2005/0010653 A1 | 1/2005 | McCanne |
| 2005/0015796 A1 | 1/2005 | Bruckner et al. |
| 2006/0248231 A1 | 11/2006 | O'Rourke et al. |
| 2009/0150937 A1 | 6/2009 | Ellis et al. |
| 2011/0173054 A1 | 7/2011 | Kutaragi et al. |
| 2011/0208582 A1 | 8/2011 | Hoyle |
| 2011/0211495 A1 | 9/2011 | Brown |
| 2011/0225046 A1 | 9/2011 | Eldering et al. |
| 2011/0231255 A1 | 9/2011 | Urbanski et al. |
| 2012/0066058 A1 | 3/2012 | Brown et al. |
| 2013/0010794 A1 | 1/2013 | Bill |
| 2013/0016721 A1 | 1/2013 | Bill |
| 2013/0063545 A1 | 3/2013 | Brown |
| 2013/0063546 A1 | 3/2013 | Brown |
| 2013/0173820 A1 | 7/2013 | Weigand et al. |
| 2013/0173821 A1 | 7/2013 | Weigand et al. |

FOREIGN PATENT DOCUMENTS

| | | |
|---|---|---|
| EP | 1 063 814 | 12/2000 |
| EP | 1071287 | 1/2001 |
| EP | 1220542 | 7/2002 |
| EP | 2395700 | 12/2004 |
| GB | 2309849 | 2/1996 |
| JP | 08-320800 | 12/1996 |
| JP | 9270793 | 10/1997 |
| JP | 11-232201 | 8/1999 |
| JP | 11-261580 | 9/1999 |
| JP | 2000-010895 | 1/2000 |
| JP | 2000-029813 | 1/2000 |
| JP | 2000-172618 | 6/2000 |
| JP | 2001-508258 | 6/2000 |
| JP | 2000-244427 | 9/2000 |
| JP | 2002-280982 | 9/2002 |
| JP | 2002-281483 | 9/2002 |
| JP | 2002-330416 | 11/2002 |
| JP | 2002-354449 | 12/2002 |
| JP | 2003-111052 | 4/2003 |
| JP | 2003-284041 | 10/2003 |
| JP | 2004536494 | 12/2004 |
| WO | WO 96/38961 | 12/1996 |
| WO | 98/31107 | 7/1998 |
| WO | 99/27741 | 6/1999 |
| WO | 00/28713 | 5/2000 |
| WO | 00/65775 | 11/2000 |
| WO | 00/65776 | 11/2000 |
| WO | 00/69101 | 11/2000 |
| WO | WO 00/69163 | 11/2000 |
| WO | 00/74373 | 12/2000 |
| WO | 02/88982 | 11/2002 |

OTHER PUBLICATIONS

ST2 Working Group L. Degrossi & L. Berger et al., "Internet Stream Protocol VCersion 2 (ST2) Protocol Specification—Version ST2+; rfc1819.txt." IETF Standard Internet Engineering Task Force, IETF, CH, Aug. 1, 1995, XP015007606 ISSN: 0000-0003, Chapter 1 *p. 6-p. 19*.

Final Office Action for U.S. Appl. No. 11/761,050 dated Feb. 3, 2010, 16 pages.

Chinese Office Action mailed Aug. 12, 2005 in Application No. 02810729.2.

Office Action, U.S. Appl. No. 10/134,552, dated Oct. 11, 2005.

F. Gong: Multipoint audio and video control for packet-based multimedia conferencing (1994),International Multimedia Conference, pp. 425-432, ISBN:0-89791-686-7.

Office Action, U.S. Appl. No. 10/090,727, dated May 10, 2005.

Office Action, U.S. Appl. No. 10/134,439, dated Jul. 25, 2005.

International Preliminary Examination Report (IPER), dated Feb. 24, 2004, Appln. No. PCT/US02/13362.

International Search Report dated Jul. 2, 2003 (Appln. No. PCT/US03/12086).

PCT International Search Report, Apr. 8, 2003, 6 pages.

Keller et al., An Active Router Architecture for Multicast Video Distribution, St. Louis, Missouri.

Lockwood et al., Reprogrammable Network Packet Processing on the Field Programmable Port Extender (FPX), 2001, St. Louis, Missouri.

Taylor et al., Dynamic Hardware Plugins (DHP): Exploiting Reconfigurable Hardware for High-Performance Programmable Routers, 2002, St. Louis, Missouri.

Choi et al., Design of a Flexible Open Platform for High Performance Active Networks, 1999, St. Louis, Missouri.

Office Action for U.S. Appl. No. 11/761,050, mailed Jul. 27, 2009.

Examination Report for European Application No. 02734066.0, mailed Apr. 16, 2009.

Office Action for Japanese Application No. 2002-586120 dated Apr. 10, 2008, 1 page.

Miyazaki, S., et al., "Stream Transmission Control Application Program Interface," *Technical Report of IEICE*, vol. 100, No. 672, pp. 341-346, in Japanese with English-language Abstract and an English-language excerpt, 11 pages total.

Office Action for U.S. Appl. No. 11/754,661, mailed Jun. 19, 2009, 8 pages.

Australian Office Action issued in 200205256 of Feb. 9, 2007.

Australian Office Action issued in 200205256 on May 26, 2008.

Canadian Intellectual Property Office, Office Action of Jan. 19, 2011, App No. 2,445,869 (3 pages).

Chinese Office Action Issued in 02810728.4 on Feb. 29, 2008.

Chinese Office Action Issued in 02810728.4 on Jul. 13, 2007.

Chinese Office Action Issued in 02810728.4 on Jun. 23, 2006.

European Office Action issued in EP02725839.1 on Apr. 16, 2009, 5 Pages.

Indian Office Action Issue din 1764/DELNP/2003 on Apr. 16, 2008.

Office Action for Japanese Application No. 2002-586120 dated Oct. 10, 2008, 1 page.

Supplemental European Search Report Issued in EP 02734066.0 on Jul. 31, 2006.

The Patent Office of the People's Republic of China, Office Action, Chinese App No. 02810729.2 mailed on Aug. 12, 2005. (13 pages).

The Patent Office of the People's Republic of China, Office Action, Chinese App No. 02810729.2 mailed on May 30, 2008 (9 pages).

The Patent Office of the People's Republic of China, Office Action, Chinese App No. 02810729.2 mailed on Nov. 2, 2007 (10 pages).

Oh-ishi, Tetsuya, et al. "Contents Delivery Function over Managed Network," IEICE Technical Report, vol. 101, No. 120, Jun. 14, 2001.

U.S. Appl. No. 09/893,692, mailed Dec. 23, 2004, Office Action.

U.S. Appl. No. 09/893,692, mailed Sep. 14, 2005, Notice of Allowance.

(56) References Cited

OTHER PUBLICATIONS

U.S. Appl. No. 09/893,692, mailed Mar. 28, 2007, Notice of Allowance.
U.S. Appl. No. 10/134,439, mailed Jul. 25, 2005, Office Action.
U.S. Appl. No. 10/134,439, mailed Jun. 12, 2006, Notice of Allowance.
U.S. Appl. No. 11/549,934, mailed Sep. 4, 2009, Office Action.
U.S. Appl. No. 11/549,934, mailed Apr. 28, 2010, Office Action.
U.S. Appl. No. 11/549,934, mailed Nov. 29, 2010, Notice of Allowance.
U.S. Appl. No. 10/090,727, mailed Jan. 3, 2007, Notice of Allowance.
U.S. Appl. No. 11/754,661, mailed Nov. 18, 2009, Notice of Allowance.
U.S. Appl. No. 12/732,929, mailed Oct. 7, 2010, Office Action.
U.S. Appl. No. 12/732,929, mailed Mar. 18, 2011, Notice of Allowance.
U.S. Appl. No. 13/173,290, mailed Jan. 3, 2012, Office Action.
U.S. Appl. No. 13/173,290, mailed Mar. 16, 2012, Notice of Allowance.
U.S. Appl. No. 10/134,552, mailed May 24, 2006, Office Action.
U.S. Appl. No. 10/134,552, mailed Aug. 8, 2006, Office Action.
U.S. Appl. No. 10/134,552, mailed Mar. 5, 2007, Office Action.
U.S. Appl. No. 10/134,552, mailed Sep. 11, 2007, Office Action.
U.S. Appl. No. 10/134,552, mailed Apr. 4, 2008, Notice of Allowance.
U.S. Appl. No. 10/157,909, mailed Aug. 9, 2006, Office Action.
U.S. Appl. No. 10/157,909, mailed Jan. 30, 2007, Notice of Allowance.
U.S. Appl. No. 11/761,050, mailed Feb. 3, 2010, Office Action.
U.S. Appl. No. 11/761,050, mailed Jul. 6, 2011, Notice of Allowance.
U.S. Appl. No. 11/761,050, mailed Oct. 21, 2011, Notice of Allowance.
Chinese Office Action mailed Nov. 2, 2007 in Application No. 02810729.2.
Chinese Office Action mailed May 30, 2008 in Application No. 02810729.2.
International Search Report dated Jul. 12, 2002, issued in PCT/US02/13363.
International Search Report dated Oct. 29, 2002, issued in PCT/US02/13362.
Office Action for Japanese Application 2002-586120 dated Mar. 4, 2008, 1 page.
U.S. Appl. No. 10/157,909, mailed May 25, 2007, Notice of Allowability.
U.S. Appl. No. 10/157,909, mailed Jun. 8, 2007, Notice of Allowability.
U.S. Appl. No. 10/157,909, mailed Sep. 10, 2007, Notice of Allowability.
U.S. Appl. No. 13/053,903, mailed Nov. 28, 2012, Office Action.
U.S. Appl. No. 13/053,903, mailed Apr. 15, 2013, Notice of Allowance.
Chickering, David Maxwell et al. "Targeted advertising with inventory management." Proceedings of the 2nd ACM conference on Electronic Commerce. Minneapolis, 2000. pp. 145-149. ACM Press.
Langheinrich, Marc et al. "Unintrusive Customization techniques for Web Advertising". Proceeding of the eigth international conference on World Wide Web. Computer Networks, Amsterdam, Netherlands, 1999. pp. 1259-1272.
Mobasher, Bamshad et al. "Effective Personalization based on Association Rule Discovery from Web Usage Data." Proceedings of the 3rd International workshop on Web Information and Data Management. Atlanta, 2001. pp. 9-15. ACM Press.
Nakano, Tadashi et al. "User Adaptive Content Delivery Mechanism on the World Wide Web." Proceedings of the 2002 ACM symposium on Applied Computing. Madrid, Spain. 2002. pp. 1140-1146. ACM Press.
Datta, Anindya et al. "An Architecture to support scalable online personalization on the web." The VLDB Journal. vol. 10, Issue 1. Aug. 2001. Springer-Verlag New York. pp. 104-117.
Brassil, Jack et al "Enhancing Internet Streaming Media with Cueing Protocols." Twentieth Annual Joint Conference of the IEEE Computer and Communications Societies. IEEE Press. 2001. vol. 1, 95-103.
McGrath, E. "Digital Insertion of Advertising into a Digital Stream." Broadcasting Convention. 1997. 258-61.
International Search Report, Appln. No. PCT/US03/19774, dated Dec. 18, 2003.
International Search Report, Jul. 14, 2003, PCT/US03/12873.
Supplemental European Search Report, EP02725839, dated Nov. 24, 2008, 3 pages.
U.S. Appl. No. 10/183,420, mailed Dec. 13, 2005, Office Action.
U.S. Appl. No. 10/183,420, mailed Jun. 22, 2006, Office Action.
U.S. Appl. No. 10/183,420, mailed Dec. 12, 2006, Office Action.
U.S. Appl. No. 10/183,420, mailed Jun. 28, 2007, Office Action.
U.S. Appl. No. 10/183,420, mailed May 20, 2010, Office Action.
U.S. Appl. No. 10/183,420, mailed Nov. 3, 2010, Office Action.
U.S. Appl. No. 10/183,420, mailed Feb. 15, 2011, Office Action.
U.S. Appl. No. 10/183,420, mailed Jun. 7, 2011, Notice of Allowance.
U.S. Appl. No. 13/227,402, mailed Feb. 10, 2012, Office Action.
U.S. Appl. No. 13/227,402, mailed Aug. 29, 2012, Office Action.
U.S. Appl. No. 13/227,402, mailed Jun. 13, 2013, Office Action.

GENERATING MULTIPLE DATA STREAMS FROM A SINGLE DATA SOURCE

CROSS-REFERENCE TO RELATED APPLICATIONS

This application claims priority from and is a continuation of U.S. patent application Ser. No. 09/893,692, filed Jun. 29, 2001, now U.S. Pat. No. 7,266,609, which claims the benefit of U.S. Provisional Application No. 60/286,964 filed Apr. 30, 2001, both of which are incorporated by reference in their entirety.

TECHNICAL FIELD

This invention relates to streaming media.

BACKGROUND

Multimedia streaming generally describes a process for allowing access to streamed multimedia content provided by or originating from one or more sources. Increased usage of the Internet has resulted in an increased demand for multimedia streaming and a corresponding need for cost effective multimedia communications solutions.

SUMMARY

In one general aspect, performance of a network system may be improved by a switch that includes a communications interface to receive a stream of data units that each include a payload portion and an attribute portion, a buffer structured and arranged to store at least payload portions of the data units, a replicator structured and arranged to duplicate at least the payload portion of one or more of the data units, and a second communications interface structured and arranged to enable access to the stream of data units by two or more terminals.

Implementations may include one or more of the following features. For example, the attribute portions of the data units may include IP packet information and/or one or more pieces of layer three information. The switch may include a processor that generates and associates an attribute portion with a payload portion that has been duplicated by the replicator. The replicator may be structured and arranged to duplicate the payload portion of the attribute portion, and the processor may be structured and arranged to change an IP header on one or more of the attribute portions duplicated by the replicator.

The processor may be structured and arranged to change an IP destination address, which may be, for example, the IP address corresponding to the terminal to which access to the payload portion is enabled using a second communications interface. The processor may be structured and arranged to specify destination information that differs among duplicated payload portions. The data unit may include, for example, audio, video, and streamed media content.

The switch may be structured and arranged to receive a request to receive a stream of data units from a terminal. The switch then may transmit the stream of data units to the requesting terminal. Implementations may include receiving the request from a device other than the terminals that will receive a stream of data units, and the switch may transmit a stream of data units to the requesting terminals or devices. The switch may enable access to the same stream of data units at two different temporal offsets. The switch may include a buffer with more than one pointer to enable access to the stream of data units at two different points and times. The buffer may store more than one instance of the stream of data units.

A source system may interface with the switch. The source system may be capable of duplicating data units and may transmit a stream of data units to the switch. Likewise, one or more terminals may interface with the switch and may receive duplicated data units from the switch.

Implementations may include a system capable of achieving the above features, including, for instance, a source system, a switch, a terminal, and a network between these components. Implementations also may include a sequence of steps performed on the switch, the source system and/or the terminal to achieve these features.

Other features and advantages will be apparent from the following description, including the drawings, and the claims.

DETAILED DESCRIPTION

For illustrative purposes, FIGS. 1-4 describe a communications system for implementing techniques for streaming data units. For brevity, several elements in the figures described below are represented as monolithic entities. However, as would be understood by one skilled in the art, these elements each may include numerous interconnected computers and components configured to perform a set of specified operations and/or dedicated to a particular geographical region.

Figure 1:
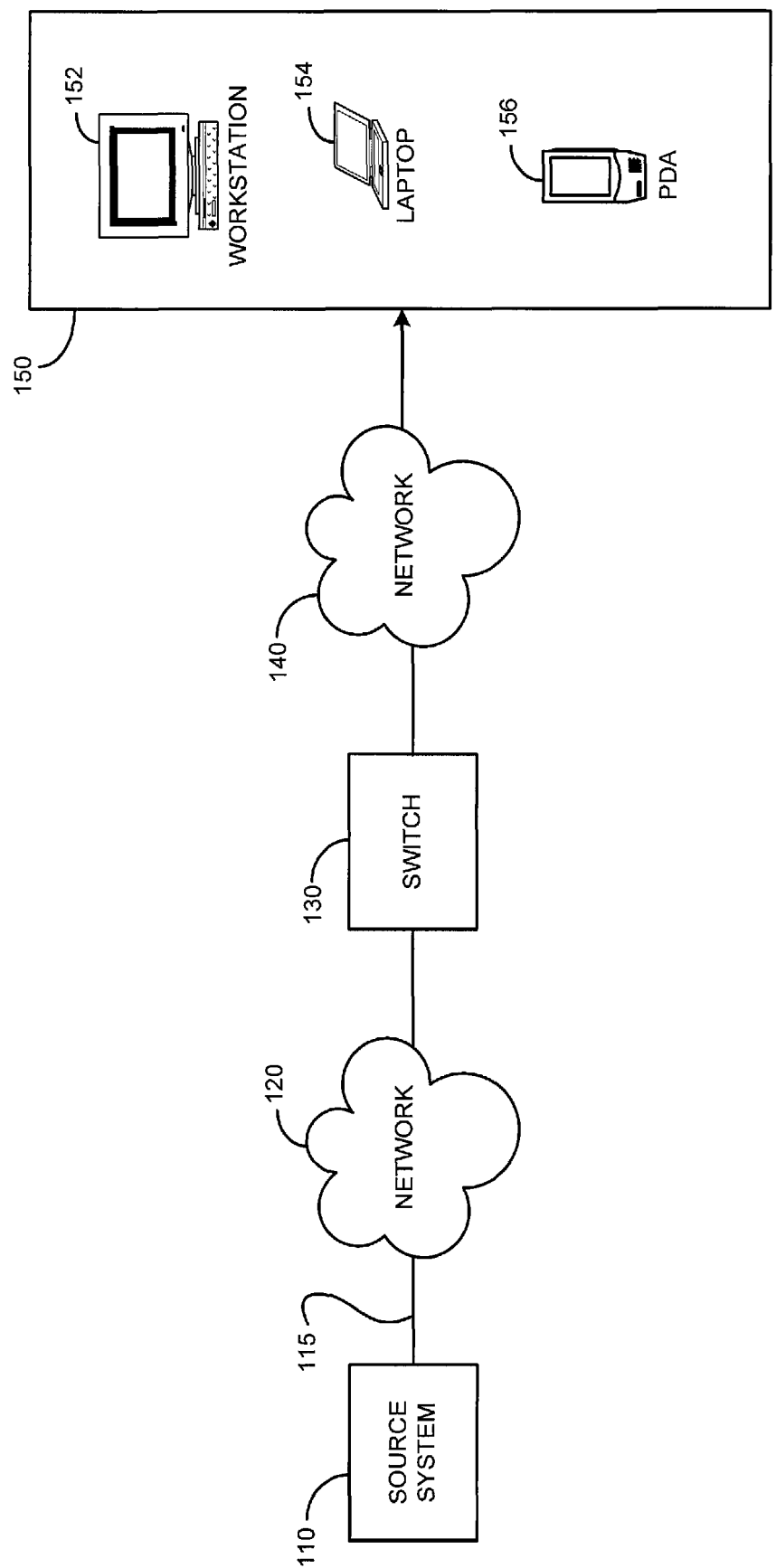
FIG. 1 is a block diagram illustrating a communications system operable to use a switch to generate multiple streams of data units from a single data source.

Referring to FIG. 1, communications system 100 may be structured and arranged with a source system 110, two or more terminals 150 and communication software and hardware that enable communications between source system 110 and terminals 150. More particularly, the communications system 100 typically includes the source system 110, a network 120, a switch 130, a network 140 and terminals 150. As will be described in greater detail with respect to FIG. 3, the source system 110 generally transmits one or more data units in a stream of data units across network 120 to one or more switches 130, where data units or portions of data units, are duplicated and transmitted to two or more terminals 150 through network 140.

Typically, a source system 110 may be structured and arranged to convert a media source (e.g., a video or audio feed) into data units for transmission across a network 120. The source system 110 may include a general-purpose computer having a central processor unit (CPU), and memory/storage devices that store data and various programs such as an operating system and one or more application programs. Other examples of a source system 110 include a workstation, a server, a device, a special purpose device or component, a broadcast system, other equipment, or some combination thereof capable of responding to and executing instructions in a defined manner. The source system 110 also typically includes an input/output (I/O) device (e.g., one or more devices having video and audio input and conversion capability), and peripheral equipment such as a display communications card or device (e.g., a modem or a network adapter) for exchanging data with the network 120.

A communications link 115 is used to communicate data between source systems 110 and network 120. Communications link 115 may include, for example, a telephone line, a wireless network link, a cable network, or a direct connection.

The network 120 typically includes hardware and/or software capable of enabling direct or indirect communications between the sending system 110 and the switch 130. The network 120 may include a direct link between the source system 110 and the switch 130, or it may include one or more networks or subnetworks between them (not explicitly shown). Each network or subnetwork may include, for example, a wired or wireless data pathway capable of carrying and receiving data. Examples of network 120 include the Internet, the World Wide Web, a WAN ("Wide Area Network"), a LAN ("Local Area Network"), an analog or a digital wired and wireless telephone network (e.g., a PSTN ("Public Switched Telephone Network"), an ISDN ("Integrated Services Digital Network"), or a xDSL ("any form of Digital Subscriber Loop")), and/or a radio, television, cable, satellite, or any other delivery mechanism for carrying data.

The switch 130 typically is structured and arranged to receive the stream of data units from the source system 110, to duplicate the stream of data units, and to transmit a stream of duplicated data units to one or more terminals 150.

In some implementations, the switch 130 is structured and arranged to perform filtering and forwarding between different domains at the same level of the protocol stack in the OSI ("Open System Interconnection") reference model. For example, in some networks, switch 130 may forward Ethernet frames between different Ethernet segments. In another example, switch 130 may forward IP packets between different IP subnets.

Generally, switch 130 includes a device that performs network operations and functions in hardware (e.g., a chip or part of chip). In some implementations, the device may include an ASIC ("Application Specific Integrated Circuit") implementing network operations logic directly on a chip (e.g., logical gates fabricated on a silicon wafer then manufactured into a chip). For example, an ASIC chip may perform filtering by receiving a packet, examining the IP address of the received packet, and filtering based on the IP address by implementing a logical gate structure in silicon.

Implementations of the device included in the switch 130 may use a Field Programmable Gate Array (FPGA). A FPGA is generally defined as including a chip or chips fabricated to allow third party designers to implement a variety of logical designs (e.g., group of gates) on the chip. For example, a third party designer may load a design within a FPGA to replace the received IP addresses with different IP addresses, or may load a design within the FPGA to segment and reassemble IP packets as they are modified while being transmitted through different networks.

Implementations of the device included in the switch 130 may include a network processor. A network processor is generally defined to include a chip or chips for allowing software to specify which network operations will be performed. A network processor may perform a variety of operations. One example of a network processor may include several interconnected RISC ("Reduced Instruction Set Computer") processors fabricated in a network processor chip. The network processor chip may implement software on some of the RISC processors to change an IP address of an IP packet. Other RISC processors in the network processor may implement software that determines which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets; however, a network processor and ASIC are generally capable of performing the same operation.

Data units handled by switch 130 may be accessed by or sent to terminals 150 through network 140. As such, network 140 is structured and arranged to receive data units transmitted from the switch 130 for transmission to the terminals 150.

The network 140 may include hardware and/or software capable of enabling direct or indirect communications between the switch 130 and the terminal 150. As such, the network 140 may include a direct link between the switch 130 and the terminal 150, or it may include one or more networks or subnetworks between them (not shown). Each network or subnetwork may include, for example, a wired or wireless data pathway capable of carrying and receiving data. Examples of the delivery network include the Internet, the World Wide Web, WANs, LANs, analog or digital wired and wireless telephone networks (e.g., PSTN, ISDN, or xDSL), radio, television, cable, satellite, and/or any other delivery mechanism for carrying data. Network 120 and network 140 may share one or more hardware or software devices.

The terminal 150 may include one or more devices capable of receiving the stream of data units transmitted by switch 130 through network 140. The terminal 150 may include a controller (not shown) that processes instructions received from or generated by a software application, a program, a piece of code, a device, a computer, a computer system, or a combination thereof, to direct operations of the terminal 150. The instructions may be embodied permanently or temporarily in any type of machine, component, equipment, storage medium, or propagated signal that is capable of being delivered to the terminal 150 or that may reside with the controller at the terminal 150. The terminal 150 may include a general-purpose computer (e.g., a personal computer) capable of responding to and executing instructions in a defined manner, a workstation 152, a laptop 154, a PDA ("Personal Digital Assistant") 156, a wireless phone, a component, other equipment, or some combination of these items that is capable of responding to and executing instructions.

For instance, in one implementation, the terminal 150 includes one or more information retrieval software applications (e.g., a browser, a mail application, an instant messaging client, an Internet service provider client, or an AOL TV or other integrated client) capable of receiving one or more data units. The information retrieval applications may run on a general purpose operating system and a hardware platform that includes a general purpose processor and specialized hardware for graphics, communications and/or other capabilities. In another implementation, terminal 150 may include a wireless telephone running a micro-browser application on a reduced operating system with general purpose and specialized hardware capable of operating in mobile environments.

Figure 2A:
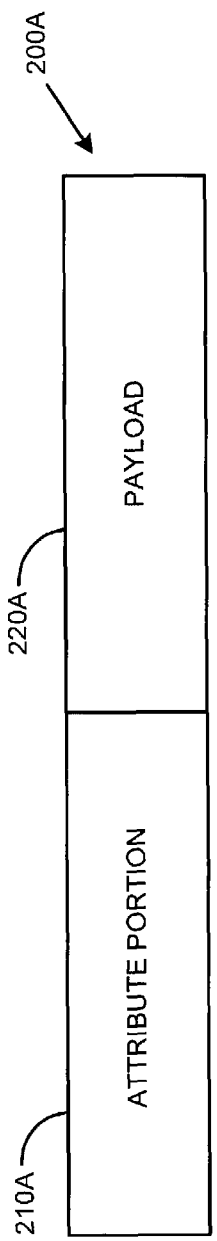
FIG. 2A is a diagram of an exemplary data unit that may be transmitted in a communications system, such as that shown in FIG. 1.

Referring to FIG. 2A, an example of a data unit 200A includes an attribute portion 210A and a payload 220A. The attribute portion 210A typically includes parameters that are modified as the data unit 200A moves through the communications system 100. For example, an IP data unit may change the layer two addressing information as the data unit moves through the network (e.g., network 140). The payload 220A typically includes information including content and/or parameters that are intended for communication from the source system and tend to change infrequently during transmission to preserve integrity of the data being transmitted. For example, the payload 220A may include audio or video content being transmitted to a personal computer (e.g., terminal 150).

Figure 2B:
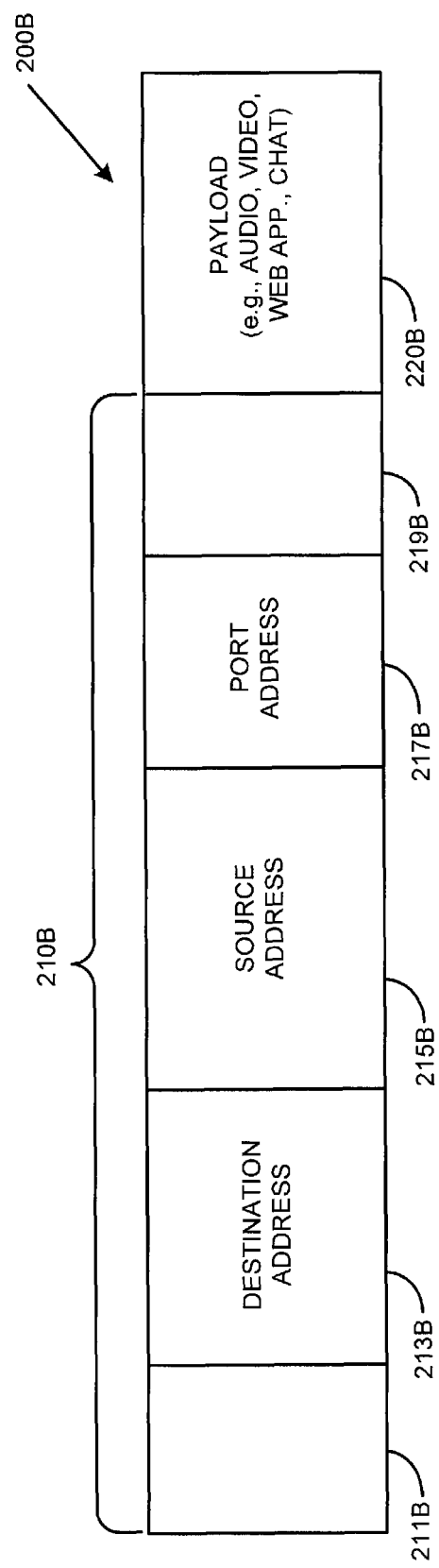
FIG. 2B is a diagram illustrating one example of the structure of an attribute portion of the data unit of FIG. 2A.

Referring to FIG. 2B, the attribute portion 210B of the data unit 200B may include several distinct or intermingled fields, such as, for example, fields of an IP ("Internet Protocol") packet. More particularly, for example, attribute portion 210B may include a destination address 213B, a source address 215B, a port number 217B indicating the type of IP traffic (e.g., UDP ("User Data Protocol"), TCP ("Transmission Control Protocol"), ICMP ("Internet Control Message Protocol")), and other parameters at various portions as represented by 211B and 219B. These fields may be arranged as shown or otherwise to accommodate various protocols. The payload in the IP data unit 200B is represented by 220B.

Figure 3:
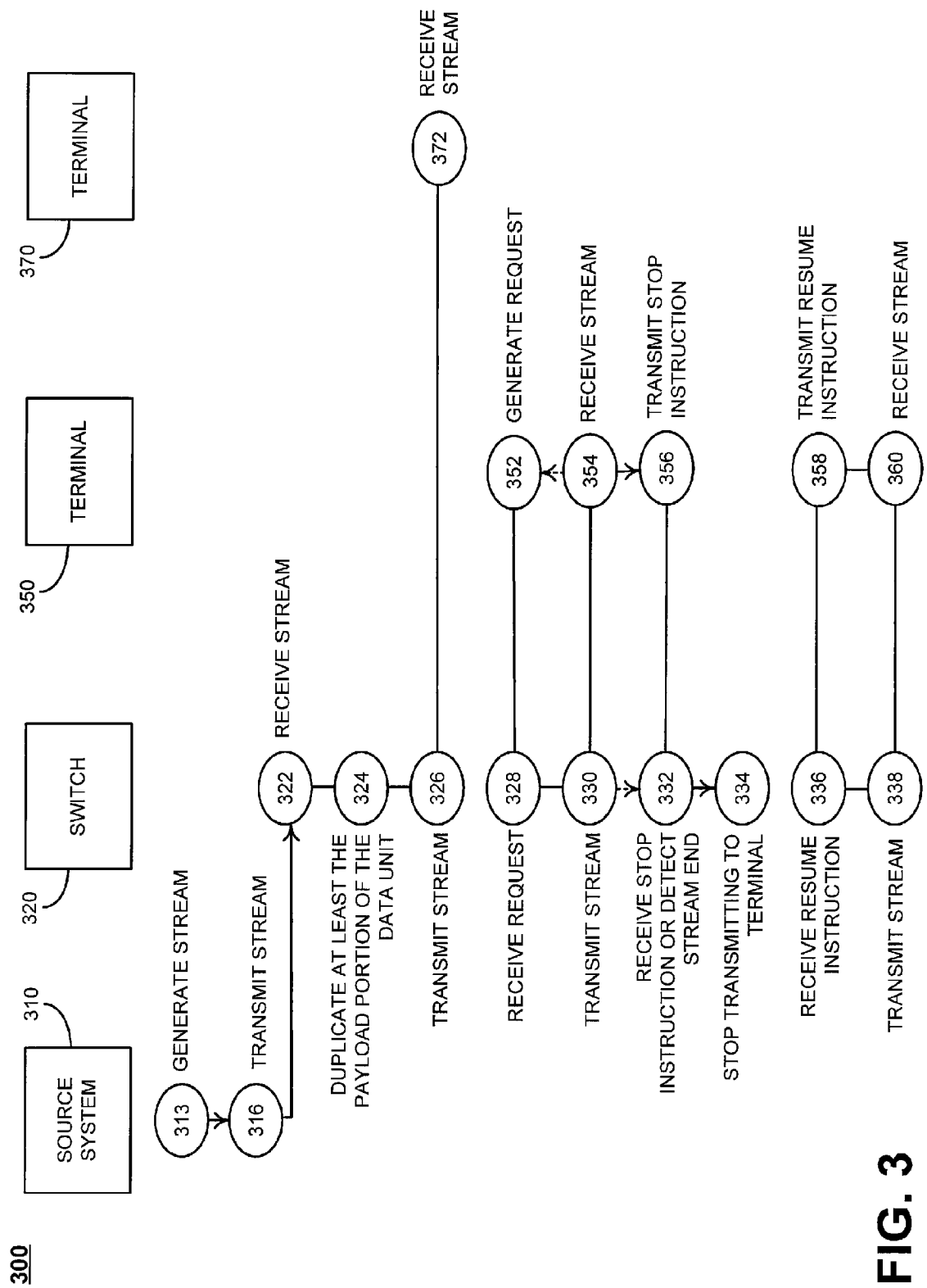
FIG. 3 is a flowchart illustrating a method of transmitting data units in a communications system, such the communications system of FIG. 1.

FIG. 3 illustrates a method of transmitting a flow of data units in a communications system 300. Communications system 300 generally includes a source system 310, a switch 320, and terminals 350 and 370. Generally, source system 310 corresponds to the source system 110 in FIG. 1, switch 320 corresponds to the switch 130 in FIG. 1, and terminals 350 and 370 correspond to components of the terminal 150 in FIG. 1.

Initially, source system 310 generates or enables access to a stream of data units in response to a request or otherwise (step 313). When the stream is derived from an analog input (e.g., analog audio or analog video), this may include converting the input into a stream of data units. Even if the input already is in digital form, enabling access to a stream of data units may involve reformatting the input into an appropriately formatted stream of data units. The stream of data units may include a variety of media streams (e.g., video, audio, images, text, and chat). Typically, the data units are IP (Internet Protocol) packets for transmission across the Internet. The source system 310 then transmits the generated stream of data units to one or more switches 320 (e.g., across network 120) (step 316).

When the switch 320 receives the data units from the source system 310 (step 322), it typically buffers and duplicates at least the payload portions of the data units (step 324). In some implementations, data unit attributes may be removed before buffering the payload. For example, for communications over the Internet, switch 320 may remove the IP header information and store only the payload and/or information represented by the payload. As the data unit is being transmitted to terminals, switch 320 modifies the existing header or adds a new IP header to the payload. The switch may use destination information corresponding to the IP address of the destination terminals (e.g., terminals 350 and 370) or an intermediary between switch 320 and the destination terminals as the destination information. With the newly acquired destination information, the switch 320 transmits the IP packets across the network (e.g., network 140 in FIG. 1) to the appropriate terminal, for example, terminal 370 in FIG. 3 (step 326).

The terminal 370 receives the stream of data units sent by the switch 320 across the network (step 372) and converts the data units into a perceivable output, manipulates the data units, or forwards the data units to another device. For example, a terminal 370 may receive a stream of IP data units containing video content and display or otherwise manipulate the video content on a personal computer or other device.

In some implementations, terminals may be capable of requesting a stream. For example, in FIG. 3, although terminal 370 is shown as automatically receiving a stream of data units (step 372), terminal 350 may be capable of generating a request to receive the stream of data units (step 352). When the switch 320 receives the request (step 328), it may transmit one or more streams of data units to terminal 350 (step 330). Terminal 350 then receives the transmitted streams of data units (step 354).

In some implementations, the switch 320 and the terminals 350 and 360 may be required to communicate periodically to maintain streaming. For example, a terminal 350 may send a "keep stream alive" message every 10 seconds to indicate that the terminal 350 wishes to receive a stream during its transmission.

While receiving a stream (step 354), the terminal 350 may request another stream (step 352) or may request termination of transmission by transmitting a request to stop sending the stream of data units (step 356). Upon receipt of a termination request or upon detection of the conclusion of the stream (step 332), the switch 320 stops transmitting the stream of data units (step 334).

Terminal 350 may elect to resume transmission of the stream of data units and may communicate this election to switch 320 (step 358). When the switch 320 receives a resume instruction (step 336), the switch resumes transmission of the stream (step 338) for receipt by the terminal 350 (step 360).

In some implementations, when the switch 320 receives a stream of IP data units from source system 310, the switch 320 may duplicate the payload portion of the data unit, and may modify or replace the IP destination address of the IP data units to specify the IP addresses of one or more conference terminals.

Typically, the switch 320 may duplicate any particular payload or all payloads more than once such that the payload of a received data unit is transmitted as the payload in several or all data units generated by the switch 320. Moreover, the switch 320 may receive a data unit and transmit the payload as two or more data units.

Conversely, the switch 320 may receive and combine more than one data unit and transmit the combined payloads of the multiple data units in a single data unit, or the switch 320 may divide the payload of a received data unit and combine the divided portions with the payloads of two or more other received data units.

As will be described with respect to FIG. 4, since the payloads are buffered, the switch 320 may produce several instantiations of the buffered payload, simultaneously, with or without offset, and may transmit those different instantiations to the same or different terminals as needed. These instantiations may be streamed to different time offsets so that terminal 350 may be listening to a stream of data units at a different point than terminal 370. For example, terminal 350 may be receiving the same song on an Internet radio station as terminal 370, but terminal 350 may be receiving data units that correspond to the song thirty (30) seconds later in time.

Figure 4:
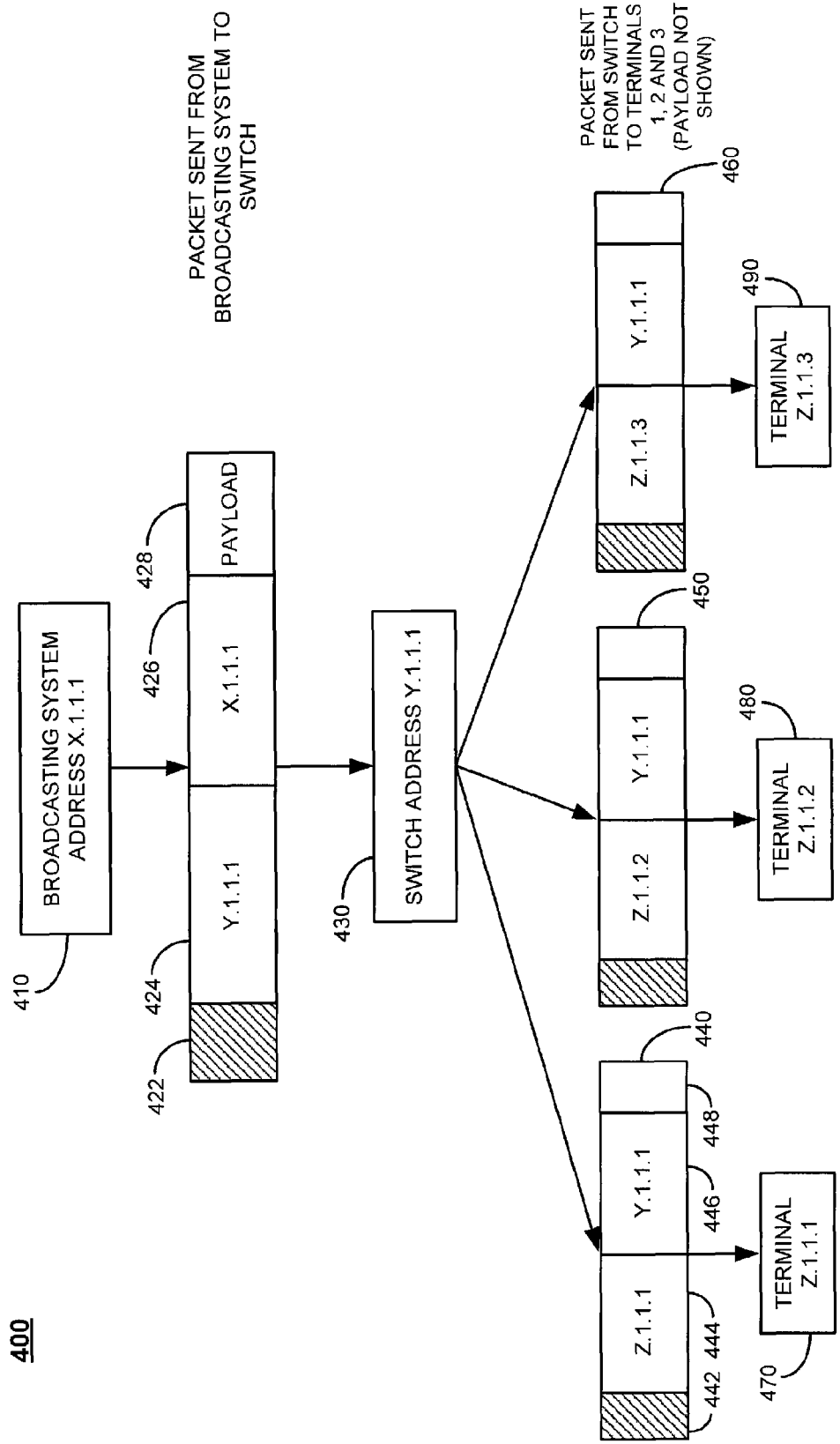
FIG. 4 is a flowchart illustrating movement of an IP packet through the communications system of FIG. 1.

FIG. 4 illustrates one example of the flow of IP data units from a source system 410 to terminals 470, 480 and 490. The source system 410 with an IP address of X.1.1.1 transmits an IP packet 420 to the switch 430 with a destination address of Y.1.1.1. The IP packet 420 includes the switch address as a destination address 424 and the source system address as a source address 426. The IP packet 420 also may include other header information 422 and a payload 428.

The switch 430, with a source address of Y.1.1.1, duplicates at least the payload 428 of the IP packet 420 and transmits an IP data unit 440 to terminal 470 with an address of Z.1.1.1. The IP data unit 440 includes the source IP address 446 of the switch 430 with a destination address 444 of terminal 470. The IP data unit 440 may include additional header information 442 and a payload 448. Similar activities take place to generate IP data units 450 and 460 for terminals 480 and 490.

Other implementations are within the scope of the following claims. For instance, implementations may include a manager requesting transmission of the stream to the terminals. The manager may include a network operator, a managing server, a workstation, or a scheduling agent. For example, a managing workstation may request transmission of the stream of data units to terminals beginning at a certain time.

Implementations also may include storing more than one instance in the stream of data units in the buffer. For example, the switch may store more than one copy of the stream to accommodate large numbers of requests. In another example, the stream may buffer the same stream of data units at two different spots.

Implementations also may include having the switch maintain state information on one or more requesting users. For example, the switch may establish or assist other devices in establishing a profile for the terminal that receives the stream of data units. In this manner, the switch leverages information available to network processors and devices, which may not ordinarily be accessible to servers, in establishing profiles.

Still further, implementations may include monitoring switch access and usage levels. For example, the switch may determine that the switch is operating at 85% of maximum performance in a given metric (e.g., processor use, memory use, number of users, bandwidth).

Implementations may include translating or transcoding content between different formats. For example, the switch may adjust transmission of packets to minimize the bandwidth consumed. In another example, the switch may convert a proprietary video-encoding format to a standards-based encoding format.

Implementations also may include inserting one or more pieces of content in an existing stream of data units. For example, the switch may insert video stream advertisements in a transmission of other video content. The inserted video content may reside on the switch, or it may be accessed from another device distinct from the switch that is transmitting the stream of data units. Implementations of inserting content may include creating tags associate with certain pieces of content being replicated. For example, the switch may be replicating a television show with commercials tagged in the video content periodically. Upon receiving the tag, the switch may stop transmitting the television show and access a series of advertisements. Implementations may include having the tag designate which advertisement to access. For example, the tag may indicate the device on which the advertisement is located. Implementations of tags also may enable accessing more than one selection of advertisements. The selection of advertisements may depend on one or more variables including, but not limited to, terminal information and profiling, the state of the network and other factors.

In addition, implementations may include inserting content based on information maintained about the user profile and user state. For example, the switch may determine that a terminal is at a suitable point in a content piece to receive an inserted advertisement for users with a particular profile.

What is claimed is:

1. A method of transmitting packets, the method comprising:
   using a switch to receive communications;
   using the switch to selectively filter and forward the received communications, wherein the switch selectively filters and forwards the received communications between different domains at a same level in a protocol stack;
   as part of the received communications, receiving a stream of content, wherein the stream of content comprises at least one data unit having a payload portion and an address portion;
   using the switch to store the stream of content;
   receiving a request from a user terminal for the content of the stored stream, wherein the request includes address information of the user terminal; and
   in response to the received request, using the switch to duplicate the stored stream of content by:
   duplicating the stored stream of content;
   replacing an address portion in at least one data unit comprising the duplicated stream with the address information of the user terminal; and
   forwarding the duplicated stream to the user terminal.

2. The method of claim 1, wherein the at least one data unit includes an Internet Protocol Packet.

3. The method of claim 2, wherein the address portion of the at least one data unit includes an Internet Protocol header.

4. The method of claim 1, wherein the address portion of the at least one data unit specifies one or more pieces of layer three information.

5. The method of claim 1, further comprising using the switch to generate and associate different address portions with duplicates of the payload portion generated by the switch.

6. The method of claim 5, wherein using the switch to associate different attribute portions with the at least one data unit and duplicates of the payload portion includes specifying destination information that differs among the duplicates of the payload portion.

7. The method of claim 5, wherein using the switch to generate and associate different attribute portions includes changing an IP destination address.

8. The method of claim 7, wherein changing the IP destination address includes changing the IP destination address to an IP address corresponding to one or more terminals for which access to the payload portion will be enabled.

9. The method of claim 1, wherein using the switch to duplicate includes duplicating only the payload portion of the at least one data unit.

10. The method of claim 1, wherein using the switch to duplicate includes using the switch to duplicate the payload portion and an attribute portion.

11. The method of claim 1, wherein the at least one data unit includes audio content.

12. The method of claim 1, wherein the at least one data unit includes video content.

13. The method of claim 1, wherein the at least one data unit includes streamed media.

14. The method of claim 1, further comprising receiving a request to receive the stream of content from at least one requesting terminal of two or more terminals.

15. The method of claim 14, further comprising enabling access to the at least one requesting terminal in response to the request.

16. The method of claim 14, wherein the request is received from a device other than the two or more terminals.

17. A duplicating switch:
a first communications interface structured and arranged to receive communications including a stream of content, wherein the stream of content comprises at least one data unit having a payload portion and an address portion;
a processor structured and arranged to selectively filter and forward the received communications, wherein the switch selectively filters and forwards the received communications between different domains at a same level in a protocol stack;
a buffer structured and arranged to store the stream of content;
a second communications interface structured and arranged to receive a request from a user terminal for the content of the stored stream, wherein the request includes address information of the user terminal; and
a replicator structured and arranged to duplicate the stored stream of content in response to the received request by:
duplicating the stored stream of content;
replacing an address portion in at least one data unit comprising the duplicated stream with the address information of the user terminal; and
forwarding the duplicated stream to the user terminal.

18. The switch of claim 17, wherein the at least one data unit includes an Internet Protocol packet.

19. The switch of claim 17, wherein the address portion specifies one or more pieces of layer three information.

20. The switch of claim 17, wherein the processor is structured and arranged to generate and associate different address portions with duplicated versions of the payload portion.

21. The switch of claim 20, wherein the processor is structured and arranged to specify destination information that differs among the duplicated versions of the payload portion.

22. The switch of claim 20, wherein the processor is structured and arranged to change an IP destination address.

23. The switch of claim 22, wherein the processor is structured and arranged to change the IP destination address to an IP address corresponding to the user terminal.

24. The switch of claim 17, wherein the replicator is structured and arranged to duplicate the payload portion and the address portion.

25. The switch of claim 17, wherein the at least one data unit includes audio content.

26. The switch of claim 17, wherein the at least one data unit includes video content.

27. The switch of claim 17, wherein the at least one data unit includes streamed media.

28. The switch of claim 17, further comprising a third communications interface structured and arranged to receive a request to receive the stream of data units from at least one requesting terminal of two or more terminals.

29. The switch of claim 28, wherein the second communications interface is structured and arranged to enable access by the at least one requesting terminal to a duplicated version of the payload portions in response to the request.

30. The switch of claim 28, wherein the requestor includes a device other than the two or more terminals.

31. The switch of claim 17, wherein the second communications interface transmits the duplicated stream of content to two different terminals.

32. The switch of claim 31, wherein the two different terminals receive the stream of content at two different temporal offsets.

33. The switch of claim 17, wherein the replicator includes more than one pointer to the stream of contents of the buffer to enable a first terminal to receive the stored stream of content at a different point in the stored stream of content than a second terminal.

34. The switch of claim 17, wherein the buffer includes more than one instance of the stream of content.

35. The switch of claim 17, wherein the replicator is structured and arranged to duplicate only the payload portion of the at least one data unit.

36. A method for distributing online video content to consumers over the Internet using a duplicating switch, the method comprising:
using the duplicating switch to receive communications;
using the duplicating switch to selectively filter and forward the received communications, wherein the duplicating switch selectively filters and forwards the received communications between different domains;
receiving a stream of online video content, wherein the stream of online video content comprises at least one data unit having a payload portion and an address portion;
using the switch to store the stream of online video content;
receiving a request from a user terminal for the online video content of the stored stream, wherein the request includes address information of the user terminal; and
in response to the received request, using the duplicating switch to duplicate the stored stream of online video content by:
duplicating the stored stream of online video content;
replacing an address portion in at least one data unit comprising the duplicated stream with the address information of the user terminal; and
forwarding the duplicated stream to the user terminal.

* * * * *